(12) United States Patent
Wang et al.

(10) Patent No.: US 12,257,549 B2
(45) Date of Patent: Mar. 25, 2025

(54) METHOD FOR PURIFYING BIOLOGICAL DUST SUPPRESSANT BY TWO-STAGE ULTRAFILTRATION

(71) Applicant: China University of Mining and Technology, Jiangsu (CN)

(72) Inventors: Hetang Wang, Jiangsu (CN); Qi Zhang, Jiangsu (CN); Yuxuan Wang, Jiangsu (CN)

(73) Assignee: China University of Mining and Technology, Xuzhou (CN)

( * ) Notice: Subject to any disclaimer, the term of this patent is extended or adjusted under 35 U.S.C. 154(b) by 0 days.

(21) Appl. No.: 18/603,379

(22) Filed: Mar. 13, 2024

(65) Prior Publication Data

US 2024/0216865 A1  Jul. 4, 2024

Related U.S. Application Data

(63) Continuation of application No. PCT/CN2023/123220, filed on Oct. 7, 2023.

(30) Foreign Application Priority Data

Oct. 6, 2022 (CN) .......................... 202211218600.6

(51) Int. Cl.
*B01D 61/14* (2006.01)
*B01D 61/20* (2006.01)

(52) U.S. Cl.
CPC ........... *B01D 61/146* (2022.08); *B01D 61/20* (2013.01)

(58) Field of Classification Search
CPC .. B01D 61/146; B01D 61/20; B01D 2311/04; B01D 61/145; B01D 61/147;

(Continued)

(56) References Cited

U.S. PATENT DOCUMENTS

2014/0142294 A1\* 5/2014 Wieser .................... C12P 19/08
435/103
2016/0201152 A1\* 7/2016 Medoff ................... C12P 19/02
127/55

FOREIGN PATENT DOCUMENTS

CN        1426831 A    7/2003
CN      101665448 A    3/2010
(Continued)

OTHER PUBLICATIONS

English language machine translation of CN103865489A, 8 pages, No Date.\*

(Continued)

*Primary Examiner* — Pranav N Patel
(74) *Attorney, Agent, or Firm* — Pilloff Passino & Cosenza LLP; Rachel Pilloff; Sean Passino

(57) ABSTRACT

A method for purifying biological dust suppressant by two-stage ultrafiltration is provided, which utilizes the differences of physical characteristics such as solubility and molecular morphology of each substance in fermentation broth to separate and purify the target product by two-stage ultrafiltration. Firstly, the fermentation broth is centrifugally pretreated to separate insoluble substances such as microbial cells; after centrifugation, the supernatant passes through a primary ultrafiltration membrane, and the polysaccharide, lactic acid and aggregated biological dust suppressant molecules with molecular weights more than 20 kilodaltons are cut off; organic solvents such as methanol and ethyl acetate are added to the retentate for dilution, further filtering is carried out with ultrafiltration membrane with a cutoff molecular weight more than 10 kilodaltons to obtain liquid product, and finally preparing solid purified product is conducted through rotary evaporation and constant temperature drying.

4 Claims, 2 Drawing Sheets

(58) Field of Classification Search
CPC ............... B01D 3/085; B01D 2311/08; B01D 2311/10; B01D 61/16; B01D 2311/12; B01D 2311/2673; B01D 2311/2676; B01D 2317/022

See application file for complete search history.

(56) References Cited

FOREIGN PATENT DOCUMENTS

| CN | 102153633 A | 8/2011 |
| CN | 103059107 A | 4/2013 |
| CN | 103773314 A | 5/2014 |
| CN | 104045686 A | 9/2014 |
| CN | 104119456 A | 10/2014 |
| CN | 106146607 A | 11/2016 |
| CN | 108184906 A | 6/2018 |
| CN | 112999897 A | 6/2021 |
| CN | 114134073 A | 3/2022 |
| CN | 115029107 A | 9/2022 |
| JP | H0827184 A | 1/1996 |
| WO | 02083710 | 10/2002 |
| WO | 02083710 A2 | 10/2002 |

OTHER PUBLICATIONS

English language machine translation of CN110331179A, 9 pages, No Date.*
Notification to Grant Patent Right for Invention dated Jan. 29, 2024 in SIPO application No. 202211218600.6.
Notice of the First Office Action dated Aug. 24, 2024 in SIPO application No. 202211218600.6.
Retrieval resport dated Aug. 18, 2023 in SIPO application No. 202211218600.6.
2d Retrieval report dated Nov. 28, 2023 in SIPO application No. 202211218600.6.
First Office Action for China Application No. 202211218600.6, mailed Aug. 24, 2023.
Takeshi Sato et al., "Synthesis of a Membrane Protein with Two Transmembrane Regions," Journal of Peptide Science, Jan. 2002, pp. 172-180.
Miscellaneous letter filed herewith.
Yu Zhangpeng et al., "Composition and interactions of autohydrolyzed polypeptide aggregates from isolated soybean eggs," Journal of South China University of Technology, Aug. 2006, vol. 34, No. 8.
Wang Hetang et al., "Experimental study on synthesis of biological dust suppressant by microbial fermentation," Journal of China Coal Society, Feb. 2021, vol. 46, No. 2.

* cited by examiner

METHOD FOR PURIFYING BIOLOGICAL DUST SUPPRESSANT BY TWO-STAGE ULTRAFILTRATION

CROSS-REFERENCE TO RELATED APPLICATIONS

This application is a continuation of PCT/CN2023/123220, filed on Oct. 7, 2023 and claims priority of Chinese Patent Application No. 202211218600.6, filed on Oct. 6, 2022, the entire contents of which are incorporated herein by reference.

TECHNICAL FIELD

The application belongs to the field of preparation of biological dust suppression materials, and in particular relates to a method for purifying biological dust suppressant by two-stage ultrafiltration.

BACKGROUND

As a by-product in industrial production, dust is easy to cause dust explosion accidents, lead to pneumoconiosis, pollute the surrounding environment and other hazards, which seriously affects the safety production of enterprises and people's lives and health. As the most important dust control method, wet dust removal technology mainly uses water-based medium to wet, coagulate and agglomerate dust, so as to settle the dust quickly and control dust.

As a new type of dust suppression material, biological dust suppressant is a secondary metabolite produced by biological fermentation. It has the advantages of excellent interface performance and biodegradability under natural conditions, with capabilities of improving the wetting and coagulation effect of water on dust, improving dust suppression efficiency and causing no pollution to the environment. Purification technology is a key link in the synthesis of the biological dust suppressant. However, traditional biological separation and purification technologies such as multistage acidification and precipitation and chemical reagent extraction have some defects, such as low production efficiency and purity, complex operation process, and easy generation of toxic and harmful substances, which leads to poor performance of target products, high production cost and environmental pollution. Therefore, the application proposes to separate and purify the biological dust suppressant by two-stage ultrafiltration.

SUMMARY

In view of the above shortcomings, a method for purifying biological dust suppressant by two-stage ultrafiltration is provided.

In order to achieve the above objective, the technical scheme adopted by the application is as follows. A method for purifying biological dust suppressant by two-stage ultrafiltration includes: fermenting and culturing a biological dust suppressant-producing strain in a culture medium to obtain fermentation broth, and refrigerating the fermentation broth at a low temperature for a period of time, then taking out the fermentation broth, subpackaging the fermentation broth into different centrifuge tubes for centrifugation, and taking supernatant; pumping the supernatant by a peristaltic pump and ultrafiltering the supernatant by a primary ultrafiltration membrane, and leaving retentate containing a target substance after the primary ultrafiltration concentration in a liquid storage tank, where the retentate is a concentrated solution; adding a mixed solution of methanol and ethyl acetate into the concentrated solution for dilution, and simultaneously reversely rinsing the primary ultrafiltration membrane; penetrating an obtained solution through a secondary ultrafiltration membrane again under an action of a power device, and penetrating organic solvent containing the target substance through the secondary ultrafiltration membrane; cleaning the secondary ultrafiltration membrane repeatedly with clean water, ultrafiltering the retentate containing the methanol and ethyl acetate again by the secondary ultrafiltration membrane, and repeating this step for three times (cleaning the secondary ultrafiltration membrane repeatedly with clean water, ultrafiltering the retentate by secondary ultrafiltration membrane); and placing penetrating fluid containing the target substance into a rotary evaporator for evaporation under reduced pressure, cooling the methanol and ethyl acetate into a recycle bottle, and drying the target substance in an evaporation bottle to remove moisture to prepare high-purity biological dust suppressant powder.

Optionally, after the biological dust suppressant-producing strain is fermented and cultured in the culture medium, the fermentation broth is refrigerated at −4° C. to 2° C. for 30 minutes, and the fermentation process is not continued at this time; the fermentation broth is subpackaged into 50 mL centrifuge tubes, with subpackage amount not more than two thirds of the centrifuge tubes, and centrifuged for 20 minutes at a relative centrifugal force of 10000 g to separate insoluble substances such as cells from the fermentation broth, and the supernatant is retained.

Optionally, after the supernatant is poured into the two-stage ultrafiltration liquid storage tank, a controller is started, a pumping speed is adjusted, and the supernatant is pumped by the peristaltic pump, slowly passes through the primary ultrafiltration membrane with a cutoff molecular weight of more than 20 kilodaltons via drainage tube, and the flow speed is controlled to be low first and then high, until the molecular weight in the filtrate is less than 20 kilodaltons, the drainage valve is opened to discharge the filtrate, and the concentrated solution not passing through the primary filtration membrane is left in the tank.

Optionally, the mixed solution of the methanol and the ethyl acetate with a ratio of 1:1 is added into the concentrated solution for dilution, with a dilution ratio of 1:10, and simultaneously the primary ultrafiltration membrane is rinsed reversely; after rinsing, a small-aperture ceramic ultrafiltration membrane is used, the controller is started, the pumping speed is adjusted, and the diluent is pumped by the peristaltic pump, the diluent flows through the secondary ultrafiltration membrane with the cutoff molecular weight of more than 10 kilodaltons via the drainage tube; after one time of ultrafiltration is completed, the secondary ultrafiltration membrane is cleaned with clean water to remove macromolecular blockages on the membrane; the remaining retentate is filtered by the secondary ultrafiltration membrane again, and the biological dust suppressant in the fermentation broth is further recycled; the remaining retentate is repeatedly filtered for three times. The penetrating fluid is collected, poured into the rotary evaporator, subjected to evaporation of reduced pressure under a vacuum degree of 0.5 and a temperature of 50° C., the methanol and the ethyl acetate are evaporated, then liquefied in a condenser tube, and recycled into a recycle bottle, and the residue in the evaporation bottle is dried to remove moisture, so as to obtain the high-purity biological dust suppressant powder.

The application has following characteristics and advantages.

The proposed method for purifying biological dust suppressant by ultrafiltration has the characteristics of simple process flow and high product separation efficiency. Compared with the traditional separation and purification technology, the fermentation broth is subjected to two-stage ultrafiltration by ultrafiltration membranes with different apertures through the power device, so that the separation of substances with different molecular weights is promoted, the biological dust suppressant with high-throughput is prepared, and a good technical foundation is provided for industrial production of the biological dust suppressant.

According to the application, the two-stage ultrafiltration method is adopted to separate and purify the biological dust suppressant, which has the property of high efficiency in separating products with high purity. Compared with the traditional method of acidification and precipitation, in the process of two-stage ultrafiltration, aggregated biological dust suppressant molecules are separated through the organic solvent, which may greatly reduce the probability of inducing methanol and products to produce impurities during acidification, improve the purity of biological dust suppressant, effectively ensure the structural consistency of biological dust suppressant, and make biological dust suppressant have stable interface performance.

The method for separating and purifying biological dust suppressant by two-stage ultrafiltration is environmentally friendly. Compared with the purification mode of chemical reagents, with consideration of the difference of physical characteristics such as solubility and molecular morphology of various substances in the fermentation broth, ultrafiltration membranes with different cutoff molecular weights are adopted in the application to purify the biological fermentation broth. Meanwhile, the molecular morphological differences before and after aggregation of biological dust suppressant are fully made use of to reduce the types and dosage of chemical purification reagents, and prevent the toxic substances from generating in the purification process.

DETAILED DESCRIPTION OF THE EMBODIMENTS

Specific embodiments of the present application are shown below, which further describe the process of separating and purifying biological dust suppressant by two-stage ultrafiltration, but the present application is not limited to these embodiments.

Embodiment 1

Figure 1:
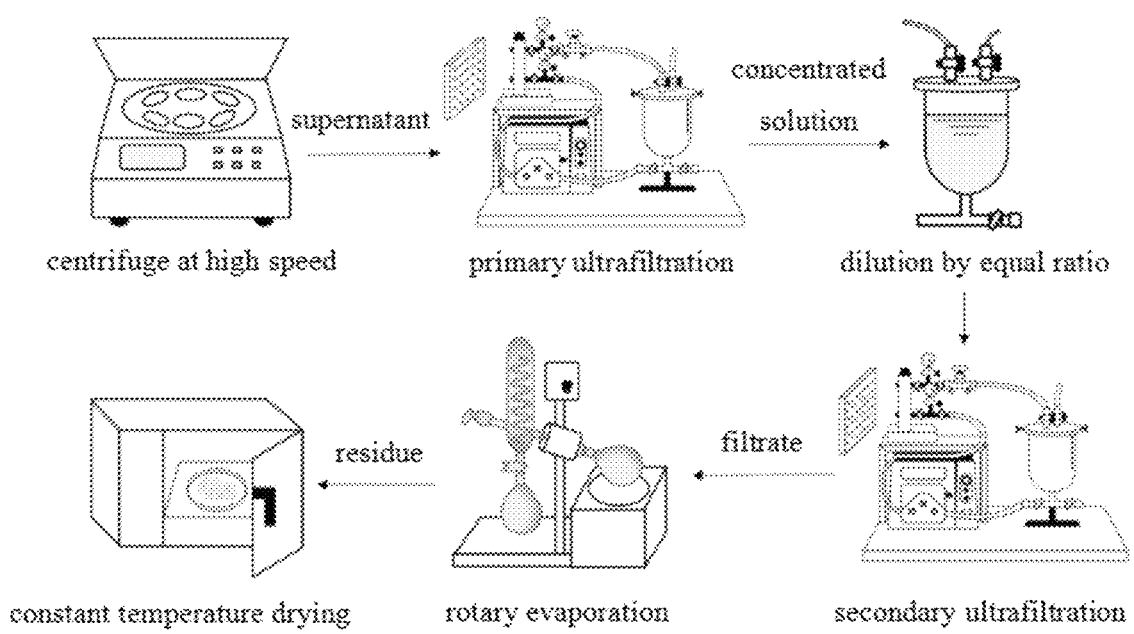
FIG. 1 is a process flow of separating and purifying biological dust suppressant by two-stage ultrafiltration.

As shown in FIG. 1, a method for purifying biological dust suppressant by two-stage ultrafiltration includes the following steps.

First of all, after the biological dust suppressant-producing strain is fermented and cultured in the culture medium to obtain fermentation broth, the fermentation broth is refrigerated at −4° C. to 2° C. for 30 minutes, and the fermentation process is not continued at this time; the fermentation broth is subpackaged into 50 mL centrifuge tubes, with subpackage amount not more than two thirds of the centrifuge tubes, and centrifuged for 20 minutes at a relative centrifugal force of 10000 g to separate insoluble substances such as cells from the fermentation broth, and the supernatant is retained.

Secondly, the fermentation broth after centrifugation is poured into the liquid storage tank, the controller is started, and the pumping speed is adjusted. Through pumping of the peristaltic pump, supernatant slowly flows through the primary ultrafiltration membrane with a cutoff molecular weight of more than 20 kilodaltons via the drainage tube, and the flow speed is controlled to be slow first and then fast, until the molecular weight in the filtrate is less than 20 kilodaltons, and the drainage valve is opened to discharge the filtrate. During the primary ultrafiltration, small molecular substances may pass through the large-aperture ultrafiltration membrane, while polysaccharide, lactic acid, protein and aggregated biological dust suppressant molecules in the fermentation broth form a concentrated solution to stay in the liquid storage tank because of cutoff by the ultrafiltration membrane.

Finally, a mixed solution of methanol and ethyl acetate with a ratio of 1:1 is added into the concentrated solution to for dilution, where the dilution ratio is 1:10, and the primary ultrafiltration membrane is simultaneously rinsed reversely; after rinsing, the small-aperture ceramic ultrafiltration membrane is used, the controller is started, the pumping speed is adjusted, and the diluent is pumped by the peristaltic pump to flow through the secondary ultrafiltration membrane with the cutoff molecular weight more than 10 kilodaltons via the drainage tube; after completing one time of ultrafiltration, the secondary ultrafiltration membrane is cleaned with clean water to remove macromolecular blockages on the membrane; the remaining retentate is filtered by the secondary ultrafiltration membrane again, and the biological dust suppressant in the fermentation broth is further recycled; the filtration is repeated three times. The penetrating fluid is collected, and poured into a rotary evaporator for evaporation of reduced pressure under a vacuum degree of 0.5 and a temperature of 50° C., the methanol and the ethyl acetate are evaporated, liquefied in a condenser tube, and recycled into a recycle bottle, and the residue in the evaporation bottle is dried to remove moisture, so as to obtain high-purity biological dust suppressant powder.

Embodiment 2

A method for purifying biological dust suppressant by two-stage ultrafiltration includes the following steps.

First of all, the fermentation broth is refrigerated at −4° C. to 2° C. for 30 minutes, the fermentation broth is subpackaged into centrifuge tubes for centrifugation for 20 minutes at a relative centrifugal force of 10000 g and the supernatant is taken. Through pumping of the peristaltic pump, the supernatant slowly flows through the primary ultrafiltration membrane with a cutoff molecular weight of more than 20 kilodaltons via the drainage tube, and the flow speed is controlled to be slow first and then fast, and the concentrated solution is obtained; the concentrated solution is poured into a rotary evaporator for evaporation of reduced pressure under a vacuum degree of 0.5 and a temperature of 50° C., the methanol and the ethyl acetate are evaporated, liquefied in a condenser tube, and recycled into a recycle bottle, and the residue in the evaporation bottle is dried to remove moisture, so as to obtain the biological dust suppressant powder after one time of ultrafiltration; 0.1 mg of powder is dissolved in water, and 2 mL solution is taken for testing mass concentration by high performance liquid chromatography.

Figure 2:
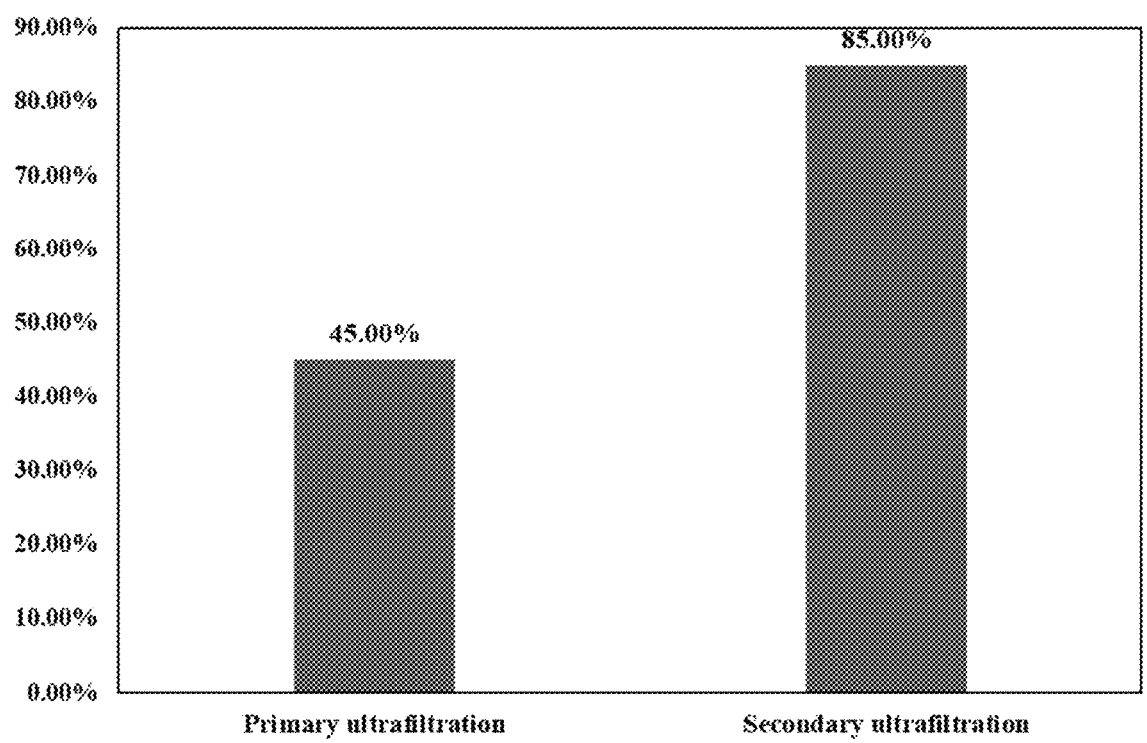
FIG. 2 shows purity test results of the biological dust suppressant.

A mixed solution of methanol and ethyl acetate with a ratio of 1:1 is added into the concentrated solution for dilution, where the dilution ratio is 1:10; diluent is pumped by a peristaltic pump and flows through the secondary ultrafiltration membrane with cutoff molecular weight more than 10 kilodaltons via the drainage tube, so as to further recycle the biological dust suppressant in the fermentation broth. The concentrated solution is poured into a rotary evaporator for evaporation of reduced pressure under a vacuum degree of 0.5 and a temperature of 50° C., methanol and ethyl acetate are evaporated, liquefied in a condenser tube, and recycled into a recycle bottle, and the residue in the evaporation bottle is dried to remove moisture to obtain high-purity biological dust suppressant powder; 0.1 mg of powder is dissolved in water, and 2 mL solution is taken for testing mass concentration by high performance liquid chromatography. The purity test results of biological dust suppressant after primary ultrafiltration and secondary ultrafiltration are shown in FIG. 2.

What is claimed is:

1. A method for purifying biological dust suppressant by two-stage ultrafiltration, comprising fermenting and culturing a biological dust suppressant-producing strain in a culture medium to obtain fermentation broth, refrigerating the fermentation broth at a temperature range of −4° C. to 2° C. for a period of time, taking out the fermentation broth, subpackaging the fermentation broth into centrifuge tubes for centrifugation, and taking supernatant after centrifugation; pumping the supernatant by a peristaltic pump and ultrafiltering the supernatant by a primary ultrafiltration membrane, and leaving a retentate containing a target substance after a primary ultrafiltration concentration in a liquid storage tank, wherein the retentate is a concentrated solution; adding a mixed solution of methanol and ethyl acetate into the concentrated solution for dilution, and simultaneously reversely rinsing the primary ultrafiltration membrane with the mixed solution of methanol and ethyl acetate; penetrating a solution obtained after dilution of the concentrated solution with the mixed solution of methanol and ethyl acetate through a secondary ultrafiltration membrane using a power device, and penetrating the diluted solution, obtained by mixing the concentrated solution with methanol and ethyl acetate, containing the target substance through the secondary ultrafiltration membrane; after cleaning the secondary ultrafiltration membrane repeatedly with clean water, ultrafiltering the retentate containing the methanol and the ethyl acetate through the secondary ultrafiltration membrane again, and repeating this step for three times; and finally placing the retentate obtained from the secondary ultrafiltration membrane, containing the target substance into a rotary evaporator for evaporation at a vacuum degree of 0.5 and a temperature of 50° C., liquefied the evaporated methanol and the ethyl acetate in the condenser tube, and recycled into a recycle bottle, and drying the residue in an evaporation bottle to remove moisture to obtain the high-purity biological dust suppressant powder; wherein a two-stage ultrafiltration purification device comprises a controller, the peristaltic pump, a sanitary fixture, a ceramic ultrafiltration membrane, a drainage tube, a flow valve and the liquid storage tank; wherein the ceramic ultrafiltration membrane comprises the primary ultrafiltration membrane and the secondary ultrafiltration membrane, the primary ultrafiltration membrane with a cutoff molecular weight of more than 20 kD is selected, and the secondary ultrafiltration membrane with a cutoff molecular weight less than 10 kD is selected.

2. The method for purifying the biological dust suppressant by two-stage ultrafiltration according to claim 1, wherein after the biological dust suppressant-producing strain is fermented and cultured in the culture medium, the fermentation broth is refrigerated at −4° C. to 2° C. for 30 min, and a fermentation process is not continued at this time; the fermentation broth is subpackaged into 50 mL centrifuge tubes, with subpackage amount not more than two thirds of the centrifuge tubes, and centrifuged for 20 min at a relative centrifugal force of 10000 g to separate insoluble substances comprising cells from the fermentation broth, and the supernatant is retained.

3. The method for purifying the biological dust suppressant by two-stage ultrafiltration according to claim 1, wherein the retentate in the liquid storage tank is pumped by the peristaltic pump to slowly pass through the primary ultrafiltration membrane with the cutoff molecular weight of more than 20 kD via the drainage tube, and a flow speed is controlled until a molecular weight in a filtrate is less than 20 kD, a drainage valve is opened to discharge the filtrate, and the concentrated solution is left in the tank.

4. The method for purifying the biological dust suppressant by two-stage ultrafiltration according to claim 1, wherein the mixed solution of the methanol and the ethyl acetate with a ratio of 1:1 is added into the concentrated solution for dilution, wherein a dilution ratio is 1:10, the primary ultrafiltration membrane is simultaneously rinsed reversely; after rinsing, the ceramic ultrafiltration membrane with aperture is used, the controller is started, the pumping speed of the diluent is adjusted, and a diluent is pumped through the peristaltic pump to flow through the secondary ultrafiltration membrane with a cutoff molecular weight less than 10 kD via the drainage tube; after completing one time of ultrafiltration, the secondary ultrafiltration membrane is cleaned with clean water to remove macromolecular blockages on the membrane; a remaining retentate is filtered by the secondary ultrafiltration membrane again, and the biological dust suppressant in the fermentation broth is further recycled; a filtration is repeated three times; the penetrating fluid is collected, poured into the rotary evaporator for evaporation of reduced pressure under a vacuum degree of 0.5 and a temperature of 50° C., the methanol and the ethyl acetate are evaporated, liquefied in a condenser tube, and recycled into the recycle bottle, and residue in the evaporation bottle is dried to remove moisture, so as to obtain the high-purity biological dust suppressant powder.

* * * * *